A. F. VICTOR.
PHOTOGRAPHIC FILM FOR PICTURE MACHINES.
APPLICATION FILED JAN. 28, 1910.

1,019,931.                                      Patented Mar. 12, 1912.

Witnesses                                        Inventor
                                        Alexander Ferdinand Victor
                                        by Frank D. Thomason
                                                Atty.

UNITED STATES PATENT OFFICE.

ALEXANDER FERDINAND VICTOR, OF TOLEDO, OHIO.

PHOTOGRAPHIC FILM FOR PICTURE-MACHINES.

1,019,931. Specification of Letters Patent. Patented Mar. 12, 1912.

Application filed January 28, 1910. Serial No. 540,541.

*To all whom it may concern:*

Be it known that I, ALEXANDER FERDINAND VICTOR, a subject of the King of Sweden, residing at Toledo, in the county of Lucas and State of Ohio, have invented new and useful Improvements in Photographic Films for Picture-Machines, of which the following is a full, clear, and exact description.

My invention relates to the photographic films for cameras, and particularly to the film for moving picture machines.

Heretofore, in order to take a very long series of pictures for a moving picture machine, an extensive strip or ribbon of transparent celluloid or other transparent material was employed, the manipulation of which when taking the pictures, and the developing of the same, not only required complicated and expensive machinery but also expert skill.

The object of my invention is to provide a peculiar shaped film which possesses all of the advantages of this long narrow strip or film, and at the same time is easy and simple to expose and develop, by either amateur and professional, and a further object is to dispense with the complicated and expensive machinery heretofore necessary. This I accomplish by means of a revoluble disk-shaped film, which is both simple and economic in construction, large numbers of which can be packed in convenient cartons or cases for shipment, and can be as easily manipulated and handled as the glass plates or celluloid films now in extensive use for the taking of pictures of fixed objects; substantially as hereinafter fully described and as particularly pointed out in the claims.

Figure 1:
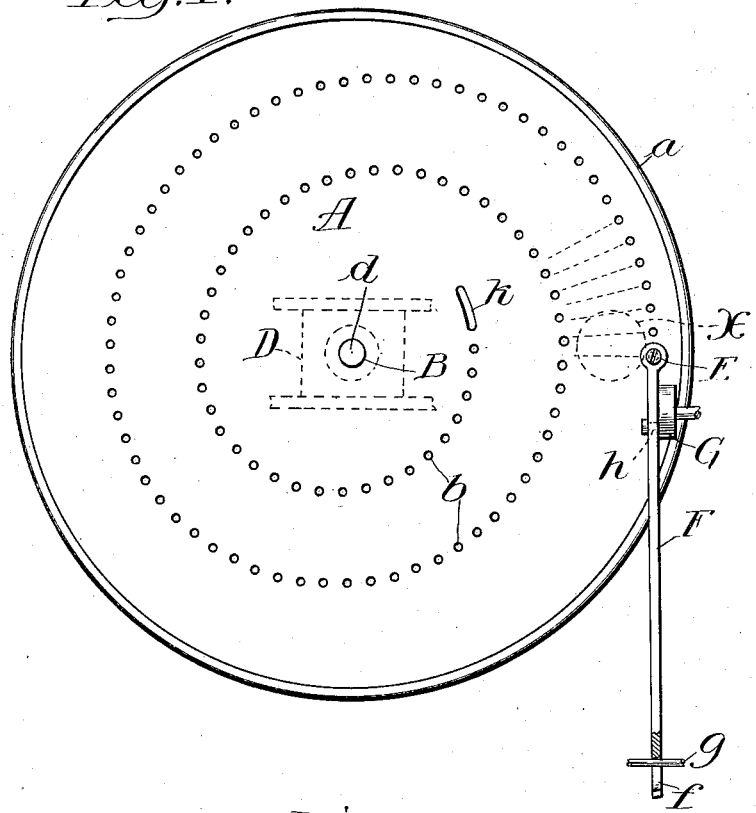
Figure 2:
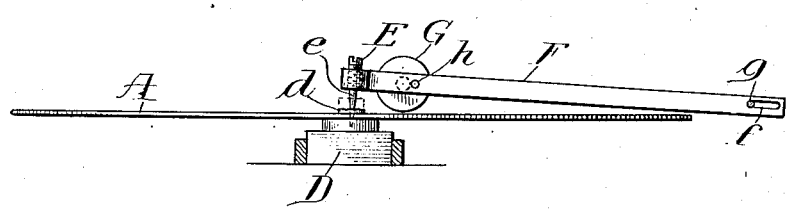

In the drawings:—Figure 1 is a plan view of my improved photographic film. Fig. 2 is an edge view of the same mounted upon a suitable carrier which is shown in side elevation.

Referring to the drawings A represents a disk or circular plate, which is, preferably, made of transparent celluloid, but which can be made of any other suitable transparent material capable of receiving the photographic emulsion and of withstanding the action of the chemicals employed in the development of the pictures taken thereon. If desired the marginal edges $a$ of this plate may be reinforced either by means of a light binding, say, of very thin aluminum, or by being folded back upon the body thereof, substantially as shown. The purpose of this reinforcement is to stiffen the plate, and to prevent the possible buckling of portions of the same, or the sagging of parts thereof when in use. The axial center of this plate is provided with an opening B, and, commencing at a suitable point near its margin, it is provided with a spiral series of equidistant perforations $b$, the inner end of which terminates at a suitable point near the center of the plate. I prefer to make the coils of this spiral series an equal distance apart throughout its length. When the plate is thus constructed one side thereof is suitably prepared and treated with a photographic emulsion, and then said plate is ready to be placed in the apparatus for taking pictures. This apparatus includes a carrier D from one side of which a centering-pin or stud $d$ projects, which latter is of such diameter as to fit into the opening B of plate A so as to permit said plate to revolve easily, but prevent it from having any independent lateral motion thereon. This carrier D has, preferably, a lateral movement back and forth, and when said disk is properly adjusted in the photographic apparatus, said perforations $b$ thereof are adapted to be engaged by a pick $e$, that is made by suitably sharpening one end of a screw E, which latter is tapped into a suitable opening in the adjacent end of a tangentially extending reciprocal bar F. The end of this bar, opposite pick $e$ is provided with a longitudinally elongated transverse slot $f$, through which a stationary pin $g$ extends, and near the end thereof adjacent to said pick a crank-pin $h$, that projects from the side of an adjacent revoluble wheel, G, extends through a suitable opening therein. The axis of the wheel G is, preferably, removed such a distance from the plane of the disk that when, during its revolutions, the crank-pin $h$ is approaching the disk, the pick will enter one of said perforations $b$, and as said wheel G revolves, the pick will be carried by the reciprocating bar F, and pull the disk, during its receding stroke and impart an intermittent rotary movement to it equal to the distance between said perforations.

The shape of the point of the pick and the tangential disposition of bar F is such that as it reciprocates in the manner hereinafter explained, it will simultaneously move the disk bodily laterally together with its carrier, so as to keep the space between the coils of the spiral series of the openings $b$ always in position back of the lens of the apparatus, the location of which latter is shown by the dotted circle X. In order to prevent pick injuring or tearing the plate when the inner end of the series of openings has been reached, and possibly continuing to rotate said plate, I provide the inner end of the latter with a segmentally elongated slot, struck from the same radius as the inner adjacent end of the series of openings or with an enlarged opening $k$. This slot or opening, $k$, is of such length that the reciprocation of the point of the pick may be free to operate therein without affecting the movements of the disk at all.

It is desired to call attention to the obvious fact that the disk may be revolved by reversing the movement of the pick actuating devices and causing the same to enter the perforations *seriatim* commencing with the innermost opening of the series, $b$, and working toward the outer end thereof. Both ways would be equally covered by my invention.

What I claim as new is:—

1. A rotatable photographic film having a spirally arranged series of perforations therein terminating at one end thereof in an enlarged opening.

2. A rotatable photographic film, the axis of which is movable transversely and having a spirally arranged series of perforations therein terminating at one end thereof in a segmentally elongated slot.

In witness whereof I have hereunto set my hand this 24th day of January 1910.

ALEXANDER FERDINAND VICTOR.

Witnesses:
 FRANK D. THOMASON,
 E. K. LUNDY.